Sept. 1, 1936. S. L. G. KNOX Re. 20,091

VAPORIZER FOR VAPOR BURNERS

Original Filed June 30, 1923 2 Sheets-Sheet 1

INVENTOR
SAMUEL L. G. KNOX
BY
Jeffery, Kimball + Eggleston
ATTORNEYS

Sept. 1, 1936. S. L. G. KNOX Re. 20,091

VAPORIZER FOR VAPOR BURNERS

Original Filed June 30, 1923 2 Sheets-Sheet 2

INVENTOR
SAMUEL L. G. KNOX
BY
Jeffery, Kimball & Eggleston
ATTORNEYS

Reissued Sept. 1, 1936 Re. 20,091

UNITED STATES PATENT OFFICE 20,091

VAPORIZER FOR VAPOR BURNERS

Samuel L. G. Knox, Englewood, N. J.

Original No. 1,840,588, dated January 12, 1932, Serial No. 289,556, June 30, 1928. Application for reissue March 25, 1935, Serial No. 13,003

10 Claims. (Cl. 122—32)

This invention relates to vaporizing hydrocarbon oils, so that they may be burned, under a boiler or otherwise, as vapors.

When a source of heat requires close regulation to wide and sudden changes in load, as for example in steam actuated excavating machinery, it is for several reasons highly desirable to use oil for fuel.

Oil is everywhere available, is easier than coal to transport and handle, and can be burned without an ash residue and with practically no smoke. An oil flame is more easily adapted to widely varying loads, on account of the elimination of the heavy fire bed necessary with solid fuel, and because of the very great ease with which the rate of burning of oil can be suddenly and considerably increased or diminished.

Being more readily adaptable to automatic control, an oil burner will require less attention than solid fuels, thereby allowing a reduction in the number of men required to run the machinery.

When petroleum oils are used to fire a boiler, the oil may be burned as an atomized fluid, or it may first be vaporized and then burned as a gas.

In the ordinary types of atomizing oil burner, the necessary draft must be obtained by a tall stack, a steam jet, or an air jet. A tall stack is generally undesirable, often impossible; and at best, since the draft is to a large extent dependent on atmospheric conditions, it is uncertain and will frequently cause an excessive flow of air, which is detrimental to economy. A steam jet uses up water—a serious consideration in a condensing engine—and requires an independent source of power when starting up with a cold boiler. An air jet is an added complication, and, when used with a steam plant, also requires an independent source of power at starting. All these would also, for efficient work, require additional means to regulate the draft in proportion to the amount of fuel burned.

This difficulty of forced draft can be obviated by vaporizing the oil before burning it, since, by means of a tube having an air inlet, oil vapor can be made to entrain the right amount of air to cause complete combustion. In a properly designed burner burning fuel supplied to it in the form of vapor or gas, the amount of air drawn in can be made to balance the amount of gas burned so closely that additional regulating means is not required. Since the air and the vaporized oil are intimately mixed before combustion begins, the flame produced is quite short, allowing the use of a relatively small firebox.

However, any installation for vaporizing the oil to be burned must guard against the following source of grave difficulty. Overheating the petroleum oils beyond a certain temperature will cause a troublesome amount of "cracking", i. e. of separation into simpler compounds of the same hydrocarbon series. Such separation is always accompanied by the liberation of carbon. This is deposited as soot, which tends to clog the burners, and makes necessary automatic apparatus or personal attention for cleaning the jets.

The cracking of crude petroleum, or of oils derived from petroleum, is dependent upon the temperature, the pressure, and the length of time the oil is subjected to the particular temperature and pressure.

It is the object of my invention to avoid this difficulty with vapor type burners, and to this end I ensure that the oil shall not be subjected to a temperature sufficient, at the given pressure, to crack the oil within the time in which it is so subjected. This I accomplish by a device which makes use of the following principles:

The boiling point of mercury, as likewise that of various other easily available substances, at or near atmospheric pressure, is below the temperature at which petroleum oils will crack, given even the maximum pressure on the oil and the length of time of heating the oil at that pressure, which may be expected in a vaporizing apparatus such as that with which I am dealing.

I purpose to make use of this property of mercury in order to resolve oils into vapor for delivery to burners of the vapor type without appreciable cracking, by interposing, as a heat barrier, between the oil and the source of heat, mercury in a closed system; so proportioning the dimensions of the apparatus that the temperature drop necessary to transfer the heat from the mercury to the oil at the rate desired will not allow the oil to reach the cracking temperature for the particular pressure to which the oil is being subjected.

In the consideration of this problem, it should be borne in mind that two totally distinct pressures are to be considered; namely, that to which the mercury is subjected and which thereby affects the boiling point of the mercury, and that to which the oil is subjected and which thereby affects the vaporizing point and the cracking point of the oil.

If there should occur any sudden, or even progressive, formation of mercury vapor in the mercury chamber, in sufficient quantity materially to raise the pressure in that chamber, the boiling point of the mercury would rise. If this process were continued a sufficient time, the flow of heat through the mercury barrier might be sufficient to crack the oil. Altho this contingency is hardly to be expected, my invention makes ample provision for preventing the mercury from reaching a temperature that would cause appreciable cracking of the oil. This I accomplish by surrounding the upper portion of the mercury chamber, namely, that portion which contains only gases, by a jacket in which water is circulated for the purpose of condensing the mercury vapor. By providing this condenser chamber with an inlet pipe and an outlet pipe at different levels, circulation results, and thus the surplus heat is carried off by mere convection, without the use of any pumping device. I also contemplate that, if the vaporizer is to be used in conjunction with a steam plant, the heat thus carried away by the water may be conserved by directly connecting said inlet and outlet pipes to the boiler; since the boiling point of mercury, at and near atmospheric pressure, is considerably above the boiling point of water at any ordinarily practical pressure.

The relation between the area of the mercury-condensing surface and that of the mercury-heating surface is made such that, with the given cooling water temperature, the condenser will have ample capacity to condense the mercury vapor as fast as it can be formed, even if the main burner is shut off, and practically all the heat of the vaporizer burner is being used in vaporizing the mercury.

It is an additional object of my invention to provide for the possibility of greatly varying use of power, without the necessity for any device to govern my vaporizer. The oil chamber being directly and freely connected to an oil reservoir in which pressure is maintained approximately constant by an air cushion, any diminution of the amount of oil vapor being consumed at the boiler will result in an increase of vapor, and therefore of pressure in the oil chamber of the vaporizer. This increase of pressure will force down the level of the oil, driving some of the oil back to the reservoir, thus decreasing the quantity of oil being subjected to vaporization. Correspondingly, an increase of consumption of the boiler will lower the pressure, and allow the oil to rise in its chamber, thus increasing the surface at which oil is being subjected to vaporizing temperature. Thus the amount of liquid-heating surface, and hence the rate of vaporization, is automatically regulated to suit the demand.

The supply of oil in the pressure-reservoir can be maintained by a pump, drawing from an oil supply. The pump will serve as a one-way valve preventing the backing-up of the oil. Excess pressure in the reservoir can be relieved by a safety valve in a by-pass around the pump.

It is also obvious that my invention is so responsive to changes in the demands upon it, that any given apparatus embodying my invention will have a very wide scope; so that the same apparatus can be applied to plants designed for fairly widely varying purposes.

The accompanying drawings illustrate a preferred embodiment of my invention, whereby I attain the advantages hereinbefore set forth.

Throughout, the same reference numbers indicate the same or similar members.

Figure 3:
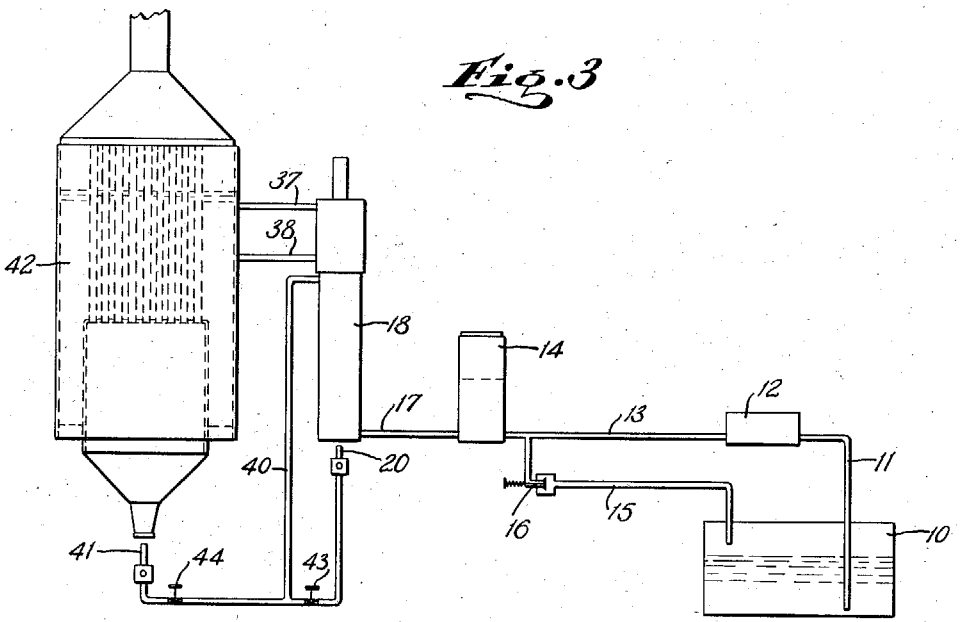
Figure 3 shows merely schematically the vaporizer, boiler, reservoir, etc., and the connections between them.

Referring to Figure 3, it is seen that 10 represents an oil reservoir, from which a pipe 11 conveys the oil to a pump 12. The pump forces the oil through a pipe 13 to the pressure chamber 14. The chamber 14 is only partially filled with oil, the remainder containing air, which therefore acts as an air-cushion, tending to even off any rapid fluctuations in the pressure—such, for instance, as are caused by the strokes of the pump.

A pipe 15 communicates at one of its ends with pipe 13, its other end opening freely into the tank or reservoir 10. This pipe 15 has a safety valve 16, which relieves any excessive pressure in the air chamber 14 by allowing some of the oil to flow back into the reservoir 10. The safety valve 16 may be set to blow off at any one of a fairly large range of pressures by the well-known device of a screw take-up acting against a compression spring.

From the base of the pressure chamber 14 a pipe 17 feeds the oil into the vaporizer 18. The construction of the vaporizer is completely shown in Figures 1 and 2. It may be said to consist of a set of three more or less concentric cylindrical tubes, which form several chambers within the vaporizer.

The innermost cylindrical space is the fire chamber or flue 19, in which oil vapor is burned, after being mixed with air at the burner 20, the amount of air entrained being subject to regulation in the same manner as in the ordinary Bunsen burner. The wall of this fire chamber 19 is the cylindrical metal tube 21 which extends the whole length of the vaporizer and is open at both ends.

Figure 1:
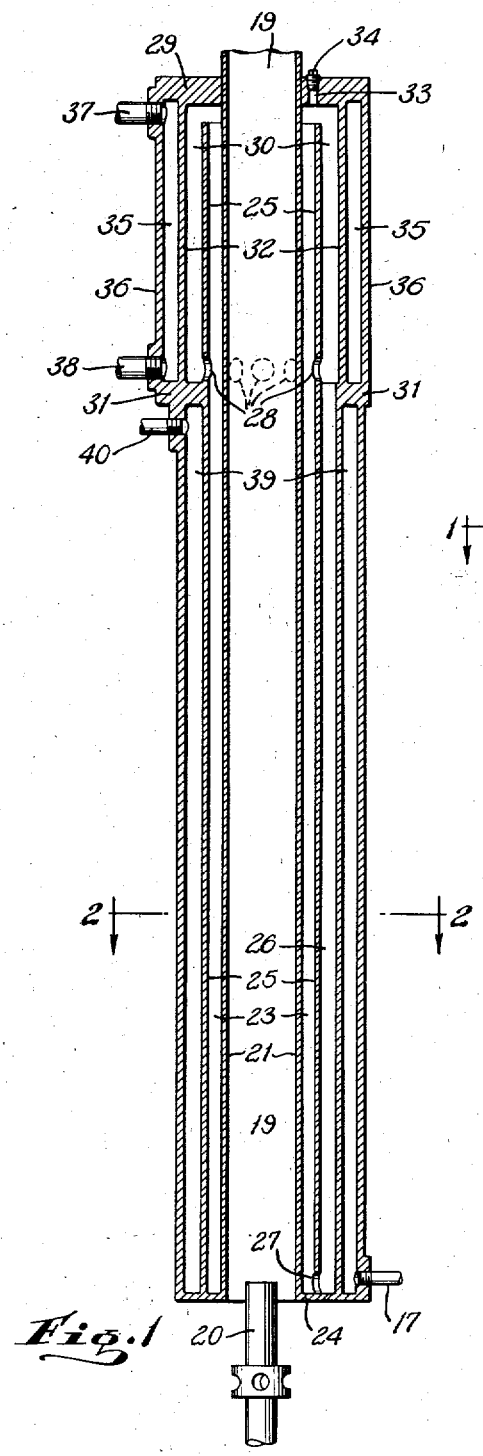
Figure 1 shows, in vertical cross section, the vaporizer containing my heat barrier.
Figure 2:
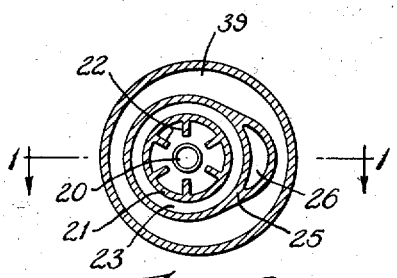
Figure 2 shows a horizontal cross section through the vaporizer, taken in the plane indicated in Figure 1 by the line 2—2.

The tube 21 may, if desired, be provided with fins, integral with 21 and projecting into the flue 19, as shown at 22, Figure 2, but omitted from Figure 1 for the sake of clearness. These fins may be of any desired size and shape, and serve the purpose of increasing the proportion of the heat of the flame taken up by the tube 21.

Surrounding the tube 21 is a chamber 23, which is to be filled with mercury for a portion of its height as will be later pointed out. This chamber extends the entire length of the vaporizer, being closed at the bottom by the bottom plate 24.

The outer wall 25 of the mercury chamber 23 has attached thereto on one side of said chamber and extending for a portion of its length, a tube 26, which is open at the top and is closed at the bottom by the bottom plate 24. Just above the bottom plate 24 a hole 27 through the wall connects the tube 26 with the mercury chamber 23.

Just above the level to which the chamber 23 is to be filled with mercury, the wall 25 is pierced by a number of holes 28, and the wall 25 does not extend upwardly quite to the head 29. There is thus free communication between the mercury chamber 23 and a condensation chamber 30 which immediately surrounds the upper part of the mercury chamber. The condensation chamber 30 is closed at the bottom by a partition 31. The tube 26 in wall 25 is continued upward through the partition 31, to provide free communication between the tube 26 and the condensation chamber 30.

Surrounding the condensation chamber is a cylindrical wall 32, joined at the bottom to the partition 31, and at the top to the head 29. The chambers 23 and 30, and the tube 26 thus communicate freely with one another, though they are closed off air-tight by walls 21, 25 and 32, and the head 29 and bottom plate 24. Access to this space is obtained through a hole 33 in the head 29, the hole being closed by a screw plug 34, or by a section of pipe containing a valve. By means of such a pipe and valve, it is possible, if desired, to adjust the pressure in the mercury chamber before beginning operations, above or below atmospheric pressure, thereby varying the boiling point of the mercury. Such a variation, by producing a higher or lower heat gradient or maximum temperature, in the mercury barrier, would increase or decrease the rate of vaporization.

The condensation chamber is surrounded by a water jacket 35, which is closed in by the head 29, the outer wall 36, and the partition 31. A pipe 37 at the top and a second pipe 38 at the bottom of the water jacket provide circulation of water, the other ends of these pipes being connected to the boiler or other reservoir of water.

Below the partition 31 and surrounding the lower, or mercury containing, portion of the mercury chamber 23 and the tube 26, is the oil chamber 39. Into the bottom of this chamber the oil supply pipe 17 before mentioned opens, and from the top the pipe 40 delivers the vapor by branches to the burner 20 at the vaporizer and to the burner 41 at the boiler 42, there being valves 43, 44, one in each branch.

The method of using the apparatus is as follows:

Plug 34 is removed for the introduction of the mercury, the level of which should stand a little below the partition 31. Plug 34 is then reinserted.

The pump 12, actuated by any convenient means, forces a supply of oil from the tank 10 into the pressure chamber 14 and thus into the oil chamber 39. For starting from a cold vaporizer, any convenient method may be used For instance, the burner 20 may be temporarily removed from its position and a blow-torch used, the flame being directed up the fire chamber 19. When the mercury and oil have been heated to produce sufficient pressure of vapor in the top of the oil chamber, the blow torch is removed and burner 20 restored to its position, valve 43 is opened and the vapor at burner 20 is ignited; and thereafter by proper regulation of the valve 43 and of the action of the pump 12, this portion of the apparatus will take care of itself with a minimum of attention.

Valve 44 is then opened and the vapor at burner 41 ignited. Any one of a number of well-known devices may be utilized to govern valve 44 according to the amount of steam being used.

When very little vapor is being burned, it will accumulate in the oil chamber 39, thus forcing down the oil level by driving the oil back into the pressure chamber 14, and therefore a less oil surface will be exposed to the heat of the mercury. In order that this action may be pronounced, I prefer that the space containing the oil (e. g. oil chamber 39) have a vaporizing wall of extended vertical dimension, as illustrated in the preferred form of device shown in the drawings. If the period when little oil is used is sufficiently prolonged, the mercury chamber 23 will boil, will condense in chamber 30, and flow back through the tube 26 to the bottom of the mercury chamber, the heat of vaporization of the mercury being thus transferred to the water in the water jacket and the boiler.

When the burner 41 is again turned full on, more vapor being burned, the level of the oil in chamber 39 will rise, and a greater surface of oil will be exposed to the heat of the mercury, and the vaporization will be accelerated.

The entire vaporizer 18 is covered with lagging (not shown), to prevent loss of heat to the surrounding air.

As an adequate water circulation may easily be maintained in the water jacket 35, it is obvious that the oil will be vaporized without being appreciably cracked.

While I have herein discussed the use of mercury as a heat barrier, it is to be understood that my device might make use, instead of mercury, of any one of a number of other substances. The only necessary condition is that the substance used shall have a boiling point below the danger point of the oil to be vaporized. For instance, sulphur, which under ordinary pressures melts at 120 degrees centigrade and boils at about 445 degrees centigrade, might be used.

It is obvious that I have provided an oil vaporizer in which there is no possibility of troublesome cracking; one that is relatively simple, economical and efficient, and one which furthermore will require only a minimum of attention.

Having now particularly described and illustrated one form of my invention, I wish it to be understood that I have not thereby limited myself to that particular embodiment, but have reserved to myself the right to make modifications and changes within the scope of the appended claims.

I claim:

1. In an oil-vapor-burning steam boiler, the combination of: the boiler proper, means for burning the oil vapor to heat the water in the boiler, a chamber for the oil which is to be vaporized, a barrier chamber in heat-exchangeable relation with the oil chamber, means for heating this barrier chamber, a liquid within the barrier chamber, the boiling point of the liquid being such that the liquid at the pressure to which it is subjected, would be vaporized at a temperature below the cracking point of the oil for the pressure to which the oil is subjected, means for carrying the oil vapor from the oil chamber to the means for burning, means for carrying away the vapor of the barrier liquid from the barrier chamber, thereby preventing the temperature of the contents of the barrier chamber from exceeding the boiling point of the barrier liquid; and a condenser for the vapor of the barrier liquid, said condenser having a water jacket in series with the boiler, to impart to the water in the boiler the heat liberated by the condensation, whereby all the heat imparted to the barrier liquid is conserved and utilized.

2. In an oil-vapor-burning steam boiler, the combination of: the boiler proper, means for burning the oil vapor to heat the water in the boiler, a chamber for the oil which is to be vaporized, an inlet pipe to admit oil to the lower part of this chamber, an outlet pipe to conduct oil vapor from the upper part of this chamber to the means for burning the vapor, a barrier chamber, in heat-exchangeable relation with the oil chamber, means for heating this barrier chamber, a liquid within the barrier chamber, the boiling point of the liquid being such that the liquid, at the pressure to which it is subjected, would be vaporized at a temperature below the cracking point of the oil for the pressure to which the oil is subjected, means for carrying the oil vapor from the oil chamber to the means for burning, means for carrying away the vapor of the barrier liquid from the barrier chamber, thereby preventing the temperature of the contents of the barrier chamber from exceeding the boiling point of the barrier liquid, a condenser for the vapor of the barrier liquid, a water jacket for cooling the condenser, said jacket being in circuit with the water chamber of the steam boiler, and a return pipe for returning the condensed vapor to the lower part of the barrier chamber.

3. In a liquid fuel vaporizer adapted to supply fuel in vapor form to a burner, the combination of means providing a chamber for the liquid fuel to be vaporized, a liquid fuel inlet line to said chamber, an outlet line for delivering vapor fuel from said chamber to the burner, a source of vaporizing heat, means providing a barrier chamber arranged in heat exchange relation with and between the heat source and the liquid fuel chamber, and, contained in said barrier chamber and carrying vaporizing heat from the heat source to the liquid fuel in the first chamber, a vaporizable substance which, at its working pressure, vaporizes at a temperature below the cracking temperature of the liquid fuel as determined by the pressure to which the fuel is subjected and the length of time it is heated at that pressure, and a condenser arranged in closed circuit with the barrier chamber and capable of condensing the vapor formed upon vaporization of the substance.

4. In a liquid fuel vaporizer adapted to supply fuel in vapor form to a burner, the combination of means providing a chamber for the liquid fuel to be vaporized, a liquid fuel inlet line to said chamber, an outlet line for delivering vapor fuel from said chamber to the burner, a source of vaporizing heat, means providing a barrier chamber arranged in heat exchange relation with and between the heat source and the liquid fuel chamber, and, contained in said barrier chamber and carrying vaporizing heat from the heat source to the liquid fuel in the first chamber, a vaporizable substance which, at its working pressure, vaporizes at a temperature below the cracking temperature of the liquid fuel as determined by the pressure to which the fuel is subjected and the length of time it is heated at that pressure, the parts being so constructed and arranged as to maintain a desired temperature differential between the substance and the liquid fuel in the first chamber, and a condenser arranged in closed circuit with the barrier chamber and capable of condensing the vapor formed upon vaporization of the substance.

5. In a liquid fuel vaporizer adapted to supply fuel in vapor form to a burner, the combination of means providing a chamber for the liquid fuel to be vaporized, a source of vaporizing heat, means providing a barrier chamber arranged in heat exchange relation with and between the heat source and the liquid fuel chamber, and, contained in said barrier chamber and carrying vaporizing heat from the heat source to the liquid fuel in the first chamber, a vaporizable substance which, at its working pressure, vaporizes at a temperature below the cracking temperature of the liquid fuel as determined by the pressure to which the fuel is subjected and the length of time it is heated at that pressure, a liquid fuel inlet line to the first chamber, an outlet line for delivering fuel vapor from the first chamber to the burner at a rate determined by the burner demand, means regulating automatically the rate of vaporization of the liquid fuel in accordance with the aforesaid rate of delivery of the fuel vapor, and a condenser arranged in closed circuit with said barrier chamber and capable of condensing the vapor formed upon vaporization of the substance.

6. In a liquid fuel vaporizer adapted to supply fuel in vapor form to a burner, the combination of means providing a chamber for the liquid fuel to be vaporized, a source of vaporizing heat, means providing a barrier chamber arranged in heat exchange relation with and between the heat source and the liquid fuel chamber, and, contained in said barrier chamber and carrying vaporizing heat from the heat source to the liquid fuel in the first chamber, a vaporizable substance which, at its working pressure, vaporizes at a temperature below the cracking temperature of the liquid fuel as determined by the pressure to which the fuel is subjected and the length of time it is heated at that pressure, the parts being so constructed and arranged as to maintain a desired temperature differential between the substance and the liquid fuel in the first chamber, a liquid fuel inlet line to the first chamber, an outlet line for delivering fuel vapor from the first chamber to the burner at a rate determined by the burner demand, means regulating automatically the rate of vaporization of the liquid fuel in accordance with the aforesaid rate of delivery of the fuel vapor, and a condenser arranged in closed circuit with said barrier chamber and capable of condensing the vapor formed upon vaporization of the substance.

7. In a liquid fuel vaporizer adapted to supply fuel in vapor form to a burner, the combination of means providing a chamber for the liquid fuel to be vaporized, a source of vaporizing heat, means providing a barrier chamber arranged in heat exchange relation with and between the heat source and the liquid fuel chamber, and, contained in said barrier chamber and carrying vaporizing heat from the heat source to the liquid fuel in the first chamber, a vaporizable substance which, at its working pressure, vaporizes at a temperature below the cracking temperature of the liquid fuel as determined by the pressure to which the fuel is subjected and the length of time it is heated at that pressure, a liquid fuel inlet line to the first chamber, an outlet line for delivering vapor fuel from the first chamber to the burner, means regulating the quantity of fuel maintained in said chamber for vaporization therein in accordance with the aforesaid rate of delivery of the fuel vapor, and a condenser arranged in closed circuit with said barrier chamber and capable of condensing the vapor formed upon vaporization of the substance.

8. In a liquid fuel vaporizer adapted to supply fuel in vapor form to a burner, the combination of means providing a chamber for the liquid fuel to be vaporized, a source of vaporizing heat, means providing a barrier chamber arranged in heat exchange relation with and between the heat source and the liquid fuel chamber, and, contained in said barrier chamber and carrying vaporizing heat from the heat source to the liquid fuel in the first chamber, a vaporizable substance which, at its working pressure, vaporizes at a temperature below the cracking temperature of the liquid fuel as determined by the pressure to which the fuel is subjected and the length of time it is heated at that pressure, the parts being so constructed and arranged as to maintain a desired temperature differential between the substance and the liquid fuel in said chamber, a liquid fuel inlet line to the first chamber, an outlet line for delivering vapor fuel from the first chamber to the burner, means regulating the quantity of fuel maintained in said chamber for vaporization therein in accordance with the aforesaid rate of delivery of the fuel vapor, and a condenser arranged in closed circuit with said barrier chamber and capable of condensing the vapor formed upon vaporization of the substance.

9. In a liquid fuel vaporizer adapted to supply fuel in vapor form to a burner, the combination of means providing a chamber for the liquid fuel to be vaporized, a source of vaporizing heat, means providing a barrier chamber arranged in heat exchange relation with and between the heat source and the liquid fuel chamber, and, contained in said barrier chamber and carrying vaporizing heat from the heat source to the liquid fuel in the first chamber, a vaporizable substance which, at its working pressure, vaporizes at a temperature below the cracking temperature of the liquid fuel as determined by the pressure to which the fuel is subjected and the length of time it is heated at that pressure, a liquid fuel reservoir in which liquid fuel is maintained under substantially constant pressure, a liquid fuel line between the reservoir and the first chamber, an outlet line for delivering vapor fuel from said chamber to the burner at a rate determined by the burner demand, means including said first chamber, reservoir and liquid fuel line for regulating the quantity of liquid fuel maintained in the first chamber for vaporization therein in accordance with the aforesaid rate of delivery of the fuel vapor, and a condenser arranged in closed circuit with said barrier chamber and capable of condensing the vapor formed upon vaporization of the substance.

10. In a liquid fuel vaporizer adapted to supply fuel in vapor form to a burner, the combination of means providing a chamber for the liquid fuel to be vaporized, a source of vaporizing heat, means providing a barrier chamber arranged in heat exchange relation with and between the heat source and the liquid fuel chamber, and, contained in said barrier chamber and carrying vaporizing heat from the heat source to the liquid fuel in the first chamber, a vaporizable substance which, at its working pressure, vaporizes at a temperature below the cracking temperature of the liquid fuel as determined by the pressure to which the fuel is subjected and the length of time it is heated at that pressure, the parts being so constructed and arranged as to maintain a desired temperature differential between the substance and the liquid fuel in said chamber, a liquid fuel reservoir in which liquid fuel is maintained under substantially constant pressure, a liquid fuel line between the reservoir and the first chamber, an outlet line for delivering vapor fuel from said chamber to the burner at a rate determined by the burner demand, means including said first chamber, reservoir and liquid fuel line for regulating the quantity of liquid fuel maintained in the first chamber for vaporization therein in accordance with the aforesaid rate of delivery of the fuel vapor, and a condenser arranged in closed circuit with said barrier chamber and capable of condensing the vapor formed upon vaporization of the substance.

SAMUEL L. G. KNOX.